United States Patent
Nagura et al.

(10) Patent No.: US 9,464,761 B2
(45) Date of Patent: Oct. 11, 2016

(54) GAS SUPPLY METHOD AND GAS SUPPLY APPARATUS

(71) Applicant: Kabushiki Kaisha Kobe Seiko Sho (Kobe Steel, Ltd.), Kobe-shi (JP)

(72) Inventors: Kenji Nagura, Takasago (JP); Hitoshi Takagi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 187 days.

(21) Appl. No.: 14/361,077

(22) PCT Filed: Dec. 5, 2012

(86) PCT No.: PCT/JP2012/081503
§ 371 (c)(1),
(2) Date: May 28, 2014

(87) PCT Pub. No.: WO2013/094408
PCT Pub. Date: Jun. 27, 2013

(65) Prior Publication Data
US 2014/0332114 A1 Nov. 13, 2014

(30) Foreign Application Priority Data
Dec. 20, 2011 (JP) .................... 2011-278635

(51) Int. Cl.
*F17C 5/06* (2006.01)
*F17C 13/02* (2006.01)

(52) U.S. Cl.
CPC ............ *F17C 13/025* (2013.01); *F17C 5/06* (2013.01); *F17C 2205/0364* (2013.01);
(Continued)

(58) Field of Classification Search
CPC ............ F17C 5/06; F17C 5/02; F17C 5/00; F17C 13/02; F17C 13/00; H01M 8/04
USPC ....................................... 141/4, 83
See application file for complete search history.

(56) References Cited

U.S. PATENT DOCUMENTS 4,165,618 A * 8/1979 Tyree, Jr. ............... 62/64
4,875,509 A * 10/1989 Da Silva ............... 141/38
(Continued)

FOREIGN PATENT DOCUMENTS

EP  1772663 A1 *  4/2007
JP  8-100888         4/1996
(Continued)

OTHER PUBLICATIONS

International Search Report Issued Feb. 12, 2013 in PCT/JP12/081503 filed Dec. 5, 2012.
(Continued)

*Primary Examiner* — Mark A Laurenzi
*Assistant Examiner* — Andrew Schmid
(74) *Attorney, Agent, or Firm* — Oblon, McClelland, Maier & Neustadt, L.L.P.

(57) ABSTRACT

A gas-filling device (1) in which the design pressure of a pressure accumulator can be reduced while downsizing a compressor includes a compressor (4) and a pressure accumulator (5). In advance, a relationship between a filling pressure and a target flow rate is determined in accordance with the volume of a tank (3), the filling pressure is detected, and the target flow rate is determined. A flow rate of a gas to be supplied into the tank (3) is controlled according to the target flow rate. In a case where the target flow rate is equal to or less than a maximum discharge flow rate of the compressor (4), the gas is supplied to the tank (3) only from the compressor (4). In a case where the target flow rate is greater than the maximum discharge flow rate, the gas is supplied to the tank (3) from the compressor (4) and the pressure accumulator (5).

8 Claims, 5 Drawing Sheets

(52) U.S. Cl.
CPC ...... *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0164* (2013.01); *F17C 2227/043* (2013.01); *F17C 2250/01* (2013.01); *F17C 2250/03* (2013.01); *F17C 2250/043* (2013.01); *F17C 2250/0439* (2013.01); *F17C 2260/026* (2013.01); *F17C 2265/065* (2013.01); *F17C 2270/01* (2013.01); *F17C 2270/0184* (2013.01); *Y02E 60/321* (2013.01)

(56) References Cited

U.S. PATENT DOCUMENTS

| | | | |
|---|---|---|---|
| 5,107,906 A * | 4/1992 | Swenson et al. | 141/11 |
| 5,169,295 A * | 12/1992 | Stogner et al. | 417/339 |
| 5,632,146 A * | 5/1997 | Foss et al. | 60/410 |
| 5,771,948 A * | 6/1998 | Kountz et al. | 141/83 |
| 5,916,246 A * | 6/1999 | Viegas et al. | 62/50.1 |
| 5,968,680 A * | 10/1999 | Wolfe et al. | 429/425 |
| 6,044,647 A * | 4/2000 | Drube et al. | 62/50.1 |
| 6,152,191 A * | 11/2000 | Chan et al. | 141/18 |
| 6,342,090 B1 * | 1/2002 | Cao | 95/23 |
| 6,360,793 B1 * | 3/2002 | Sugano et al. | 141/197 |
| 2004/0079441 A1 * | 4/2004 | Richey et al. | 141/83 |
| 2004/0182470 A1 * | 9/2004 | White | 141/11 |
| 2005/0132719 A1 * | 6/2005 | Svensson et al. | 62/50.1 |
| 2007/0051423 A1 * | 3/2007 | Handa | 141/94 |
| 2007/0215209 A1 * | 9/2007 | Street et al. | 137/263 |
| 2007/0298313 A1 * | 12/2007 | Iida | 429/49 |
| 2008/0008602 A1 * | 1/2008 | Pozivil et al. | 417/243 |
| 2008/0128029 A1 * | 6/2008 | Gorman | 137/209 |
| 2009/0151812 A1 * | 6/2009 | Allidieres | 141/11 |
| 2009/0229701 A1 * | 9/2009 | Allidieres et al. | 141/2 |
| 2010/0139777 A1 * | 6/2010 | Whiteman | 137/14 |
| 2010/0175778 A1 * | 7/2010 | Adler et al. | 141/4 |
| 2010/0193070 A1 * | 8/2010 | Allidieres | 141/11 |
| 2011/0167824 A1 * | 7/2011 | Mak | 60/651 |
| 2011/0189569 A1 * | 8/2011 | Sinha et al. | 429/429 |
| 2011/0189573 A1 * | 8/2011 | Sinha et al. | 429/444 |
| 2012/0111447 A1 * | 5/2012 | Mori et al. | 141/4 |
| 2012/0180900 A1 * | 7/2012 | Brouqueyre et al. | 141/4 |
| 2012/0308908 A1 * | 12/2012 | Katano | 429/429 |
| 2013/0125568 A1 * | 5/2013 | Chalk et al. | 62/115 |
| 2013/0133759 A1 * | 5/2013 | Kato et al. | 137/488 |
| 2014/0102587 A1 * | 4/2014 | Nagura et al. | 141/69 |
| 2014/0174105 A1 * | 6/2014 | Gerstler et al. | 62/48.2 |
| 2014/0196814 A1 * | 7/2014 | Nagura et al. | 141/82 |
| 2014/0224379 A1 * | 8/2014 | Adler et al. | 141/4 |
| 2014/0332114 A1 * | 11/2014 | Nagura et al. | 141/4 |
| 2015/0013829 A1 * | 1/2015 | Kuehl et al. | 141/4 |
| 2015/0153005 A1 * | 6/2015 | Takano et al. | 141/4 |
| 2015/0167895 A1 * | 6/2015 | Nagura et al. | 141/4 |
| 2015/0171444 A1 * | 6/2015 | Tanaka | 426/466 |
| 2015/0315949 A1 * | 11/2015 | Jansson et al. | 123/2 |

FOREIGN PATENT DOCUMENTS

| | | |
|---|---|---|
| JP | 8-109999 | 4/1996 |
| JP | 2010-520977 | 6/2010 |
| JP | 2010-534308 | 11/2010 |
| JP | 2011-99468 | 5/2011 |
| WO | 03/060374 | 7/2003 |

OTHER PUBLICATIONS

Written Opinion of the International Searching Authority issued Feb. 12, 2013 in PCT/JP12/081503 filed Dec. 5, 2012.

"Nenryo Denchi System to Jissho Kenkyu (Dai 2 Ki JHFC Project) Hokokusho", [online], Mar. 2011, [retrieval date Jan. 24, 2013], Internet URL:http://www.jari.or.jp/jhfc/data/reprt/pdf/tuuki_phase2_01.pdf, pp. 271-281, 293-297.

* cited by examiner

GAS SUPPLY METHOD AND GAS SUPPLY APPARATUS

TECHNICAL FIELD

The present invention relates to a method of supplying a gas to a tank and a gas supply apparatus.

BACKGROUND ART

Recently, there is a concern about influences of global warming and air pollution due to carbon dioxide ($CO_2$), nitrogen oxide (NOX), suspended particulate matters (PM), and the like contained in exhaust gases of vehicles. Therefore, there is an increasing attention to a fuel cell-powered vehicle (FCV) driven by utilizing electric energy based on chemical reactions of hydrogen and oxygen with a loaded fuel cell instead of the conventional gasoline internal combustion engine type vehicle.

The fuel cell-powered vehicle neither discharges carbon dioxide described above nor discharges other harmful substances. With excellent energy efficiency in comparison to the gasoline internal combustion engine type vehicle and the like, the fuel cell-powered vehicle has various advantages that are not provided in the gasoline internal combustion engine type vehicle.

When broadly divided, the fuel cell-powered vehicle includes a type of supplying hydrogen from a hydrogen station and a type of supplying fuel other than hydrogen and manufacturing hydrogen by an in-vehicle reformer. From an effect of reducing carbon dioxide ($CO_2$) and the like, the former type is regarded as more advantageous. Therefore, there is an urgent need for researching and developing the fuel cell-powered vehicle and the hydrogen station for supplying hydrogen to the vehicle.

A filling system station disclosed in Patent Document 1 includes two buffer containers and a compressor. The buffer containers and the compressor are respectively connected to a supply line connected to a tank of a vehicle. At the time of filling the tank with a gas, the gas is respectively supplied from the buffer containers and the compressor via the supply line at the same time.

Patent Document 2 discloses a method in which at the time of filling a tank with a gas, a pressurized gas is firstly and instantaneously blown in, the internal pressure of the tank is measured, and the tank is filled with the gas while controlling pressure increase speed of the tank.

CITATION LIST

Patent Document

[Patent Document 1] JP 2010-534308 A
[Patent Document 2] JP 2010-520977 A

SUMMARY OF THE INVENTION

Problems to be Solved by the Invention

When a tank is filled with a gas by utilizing only a compressor, there is a need for ensuring a flow rate of the gas to be supplied to the tank from the compressor. Thus, the size of the compressor is increased. When the tank is filled with the gas by utilizing only a pressure accumulator, there is a need for storing a high-pressure gas in the pressure accumulator. Thus, the design pressure of the pressure accumulator is increased.

The present invention is achieved in consideration with the above problems, and an object thereof is to provide a gas-filling apparatus in which the design pressure of a pressure accumulator can be reduced while downsizing a compressor.

Means for Solving the Problems

In order to solve the above problems, according to the present invention, a gas supply method in which a gas is supplied to a tank by using a compressor and a pressure accumulator arranged in parallel to the compressor, the pressure accumulator being capable of storing the gas compressed by the compressor, includes a flow rate determination step of determining a relationship between a filling pressure that serves as a pressure of the gas to be supplied to the tank and a target flow rate that serves as a target value of a flow rate of the gas to be supplied to the tank before supplying the gas to the tank from the compressor, and a flow rate control step of detecting the filling pressure, determining the target flow rate, and controlling the flow rate of the gas to be supplied into the tank according to the target flow rate, wherein in the flow rate control step, the gas is supplied to the tank only from the compressor in a case where the target flow rate is equal to or less than a maximum discharge flow rate of the compressor, and the gas is supplied to the tank from the compressor and the pressure accumulator in a case where the target flow rate is greater than the maximum discharge flow rate.

According to this method, the gas is mainly supplied by the compressor. However, at the time of a peak of a required gas supply amount, the gas is also supplied from the pressure accumulator. Thus, the volume of the compressor is not necessarily large, so that the compressor can be downsized. Since the pressure accumulator is used only for assistance at the time of the peak, the volume is not necessarily large and the design pressure is not necessarily high. Thus, the structure is not complicated for resistance to the pressure.

In the gas supply method of the present invention, in a case where the target flow rate is greater than the maximum discharge flow rate, a flow rate of the gas to be supplied to the tank from the compressor may be fixed and a flow rate of the gas to be supplied to the tank from the pressure accumulator may be regulated, so that the total flow rate of the gas to be supplied to the tank matches with the target flow rate.

According to this method, the ability of the compressor is utilized to a maximum extent. Thus, the volume of the pressure accumulator is not increased, so that the pressure accumulator with a small and simple structure can be utilized.

According to the present invention, a gas supply apparatus that supplies a gas to a tank includes a volume-controllable compressor that compresses the gas to be supplied to the tank, a pressure accumulator arranged in parallel to the compressor, the pressure accumulator being capable of storing the gas compressed by the compressor, a pressure accumulator control valve that regulates a flow rate of the gas flowing out from the pressure accumulator, a flowmeter that detects a flow rate of the gas to be supplied to the tank, a filling pressure meter that detects a pressure of the gas to be supplied to the tank, and a control device that controls the volume of the compressor and an opening degree of the pressure accumulator control valve, and the control device determines a relationship between a filling pressure that serves as a pressure of the gas to be supplied to the tank and a target flow rate that serves as a target value of a flow rate of the gas to be supplied to the tank before supplying the gas to the tank from the compressor, determines the target flow rate based on the pressure detected by the filling pressure meter, closes the pressure accumulator control valve and supplies the gas to the tank only from the compressor in a case where the target flow rate is equal to or less than a maximum discharge flow rate of the compressor, and opens the pressure accumulator control valve and supplies the gas to the tank from the compressor and the pressure accumulator in a case where the target flow rate is greater than the maximum discharge flow rate.

According to this configuration, the ability of the compressor is utilized to a maximum extent and only a part that exceeds the ability of the compressor is supplemented by the pressure accumulator. Thus, the size of the compressor and the pressure accumulator is not increased. Since there is no need for increasing the design pressure of the pressure accumulator, the structure of the pressure accumulator can be simplified.

It should be noted that the compressor may have a return line that provides communication between the discharge side and the suction side, a volume regulating valve whose opening degree is regulatable may be provided in the return line, and the fact that the target flow rate reaches the maximum discharge flow rate of the compressor may be determined by the fact that the volume regulating valve is totally closed. The rotation number of the compressor may be controllable, and the fact that the target flow rate reaches the maximum discharge flow rate of the compressor may be determined by the fact that the rotation number becomes the maximum rotation number.

The gas supply apparatus of the present invention includes a plurality of pressure accumulators that includes the pressure accumulator, and the pressure accumulators may be arranged in parallel to each other and store gases at different pressures from each other, and the control device may supply the gas to the tank from any one of the pressure accumulators in accordance with the pressure detected by the filling pressure meter.

According to this configuration, the volume of the pressure accumulators can be reduced and some of the pressure accumulators may have a high pressure. The volume of the compressor can also be more downsized.

In the gas supply apparatus of the present invention, the compressor may be a reciprocating compressor, and the gas supply apparatus may have a nozzle that fits an in-vehicle tank mounted in a fuel cell-powered vehicle.

Effect of the Invention

As described above, according to the present invention, at the time of the peak of the required gas supply amount, the compressor is assisted by the pressure accumulator. Thus, the volume of the compressor is not necessarily large and the volume of the pressure accumulator is also not necessarily large. Therefore, the compressor can be downsized and the design pressure of the pressure accumulator can be reduced.

MODES FOR CARRYING OUT THE INVENTION

Figure 1:
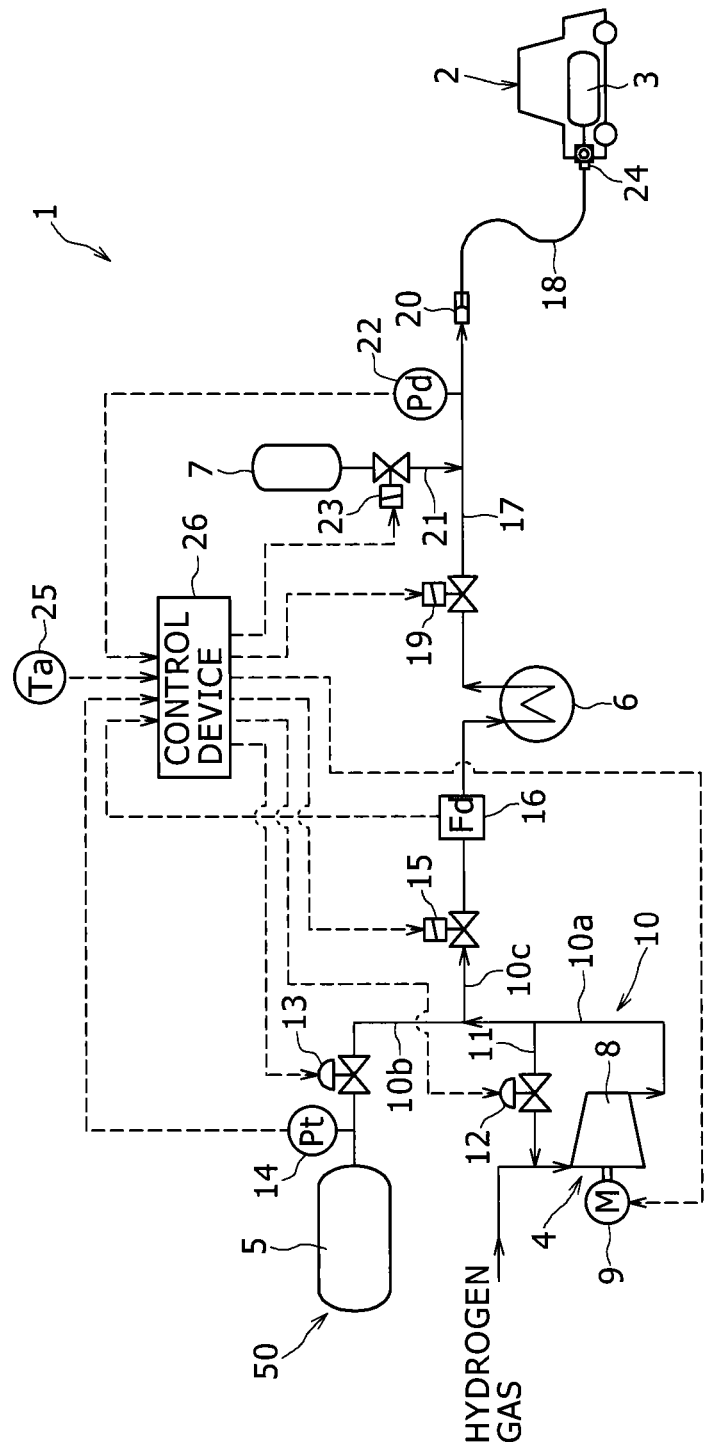
FIG. 1 A schematic configuration diagram of a gas supply apparatus of a first embodiment of the present invention.

Hereinafter, embodiments of the present invention will be described with reference to the drawings. FIG. 1 shows a gas supply apparatus 1 according to a first embodiment of the present invention. The gas supply apparatus 1 is an apparatus mainly for supplying a hydrogen gas into an in-vehicle tank 3 of a fuel cell-powered vehicle 2. The gas supply apparatus 1 includes a compressor 4, a pressure accumulator 5, a cooler 6, and an initial filling reservoir 7.

The compressor 4 is a reciprocating compressor and includes a compressor main body 8, and a motor 9 that serves as a motor for driving the compressor main body 8. The compressor main body 8 suctions and compresses the hydrogen gas from a hydrogen supply source, and supplies the compressed hydrogen gas to the cooler 6 via a supply line 10.

The pressure accumulator 5 is arranged in parallel to the compressor 4 with respect to the cooler 6, and connected to the cooler 6 via the supply line 10. For this, the supply line 10 includes a compressor-exclusive portion 10a through which only the hydrogen gas discharged from the compressor 4 passes, a pressure accumulator-exclusive portion 10b through which only the hydrogen gas flowing into the pressure accumulator 5 and the hydrogen gas flowing out from the pressure accumulator 5 pass, and a shared portion 10c through which both the hydrogen gas from the compressor 4 and the hydrogen gas from the pressure accumulator 5 pass.

The gas supply apparatus 1 has a return line 11 that branches from the compressor-exclusive portion 10a of the supply line 10 and is connected to a suction flow passage of the compressor 4. A volume regulating valve 12 whose opening degree is regulatable is provided in the return line 11, and the return line connects a suction port and a discharge port of the compressor main body 8 via the volume regulating valve 12. By opening this volume regulating valve 12, a part of the hydrogen gas discharged from the compressor main body 8 can be returned to the suction port of the compressor main body 8. Thereby, a flow rate of the gas discharged from the compressor main body 8 (volume of the compressor 4) can be substantially regulated.

A pressure accumulation device 50 includes the pressure accumulator 5, a pressure accumulator control valve 13, and an accumulated pressure meter 14. The pressure accumulator 5 stores the high-pressure hydrogen gas discharged by the compressor 4. The pressure accumulator control valve 13 whose opening degree is regulatable is provided in the pressure accumulator-exclusive portion 10b in the vicinity of the pressure accumulator 5. The accumulated pressure meter 14 is connected to the pressure accumulator 5, and the accumulated pressure meter 14 detects a pressure Pt of the hydrogen gas in the pressure accumulator 5.

A supply blocking valve 15 and a flowmeter 16 that detects a flow rate Fd of the hydrogen gas are provided in the shared portion 10c of the supply line 10. The cooler 6 and the in-vehicle tank 3 of the fuel cell-powered vehicle 2 are connected by a filling line 17 and a flexible hose 18. A filling blocking valve 19 is provided in the filling line 17, and the filling line is connected to the flexible hose 18 by an emergency separation coupler 20 provided in a terminal end thereof. The emergency separation coupler 20 is formed as a brittle portion that is weaker than the tensile strength of the flexible hose 18. When the flexible hose 18 is pulled and a large tensile force is applied to the emergency separation coupler 20, the emergency separation coupler is divided into two parts, so that the filling line 17 and the flexible hose 18 are separated. A blocking valve is provided in the two parts of the emergency separation coupler 20, so that the hydrogen gas is prevented from leaking out from the tank 3 and the filling line 17.

An initial filling line 21 connected to the initial filling reservoir 7 branches from a part between the filling blocking valve 19 and the coupler 20 of the filling line 17. Further, a filling pressure meter 22 that detects a filling pressure Pd of the hydrogen gas to be equated as a pressure in the in-vehicle tank 3 is provided in the filling line 17. An initial filling open/close valve 23 is provided in the initial filling line 21. A nozzle 24 that fits the in-vehicle tank 3 of the fuel cell-powered vehicle 2 is provided in a leading end of the flexible hose 18.

The gas supply apparatus 1 has a thermometer 25 that detects an external air temperature Ta, and a control device 26 into which detection signals of the accumulated pressure meter 14, the flowmeter 16, the filling pressure meter 22, and the thermometer 25 are inputted. The control device 26 controls start-up and stoppage of the compressor 4 and the cooler 6, and also controls open/close of the volume regulating valve 12, the pressure accumulator control valve 13, the supply blocking valve 15, the filling blocking valve 19, and the initial filling open/close valve 23.

In the present embodiment, when the tank 3 is filled with the hydrogen gas, there is a need for filling the pressure accumulator 5 of the pressure accumulation device 50 with the high-pressure hydrogen gas in advance. The pressure accumulator 5 is filled with the hydrogen gas by operating the compressor 8 in a state where the supply blocking valve 15 is closed and the pressure accumulator control valve 13 is opened, compressing the hydrogen gas supplied from the hydrogen supply source, and supplying the compressed hydrogen gas to the pressure accumulator 5 of the pressure accumulation device 50. When the pressure detected by the pressure meter 14 reaches a predetermined pressure value, the pressure accumulator control valve 13 is closed and the filling of the pressure accumulator 5 with the hydrogen gas is finished.

Figure 2:
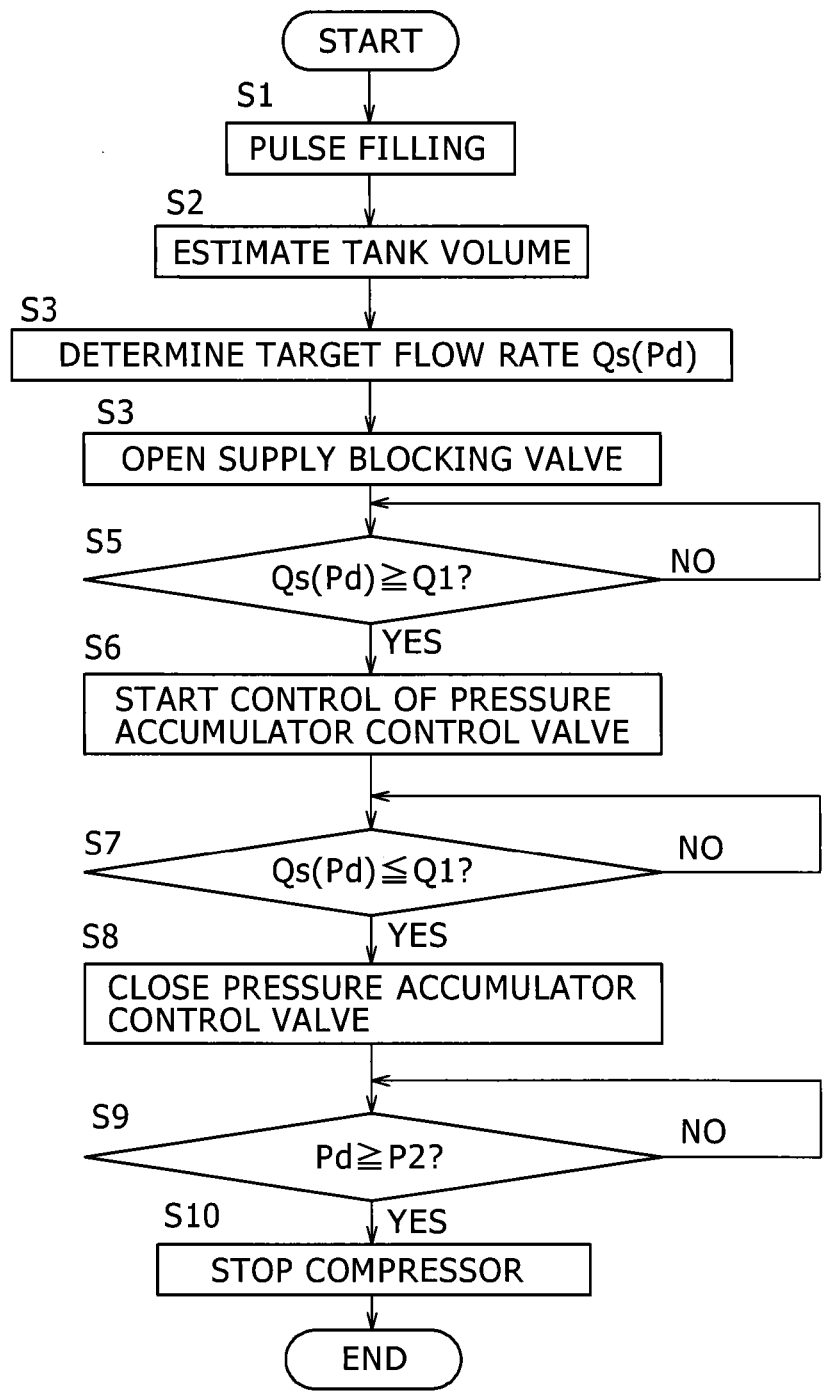
FIG. 2 A flowchart of gas supply by the gas supply apparatus of FIG. 1.

FIG. 2 is a view showing a flow of filling the tank 2 with the hydrogen gas. In the present embodiment, Steps S1 to S3 are flow rate determination steps required for determining a target flow rate Qs (Pd). Steps S4 to S10 are flow rate control steps of regulating the flow rate of the hydrogen gas to be supplied to the in-vehicle tank 3. At the time of filling of the hydrogen gas, the gas supply apparatus 1 firstly opens the initial filling open/close valve 23 for a predetermined short time in a state where the filling blocking valve 19 is closed and instantaneously supplies the high-pressure hydrogen gas from the initial filling reservoir 7 to the tank 3 in Step S1 (called as the "pulse filling").

In Step S2, by the control device 26, based on the external air temperature Ta detected by the thermometer 25, the temperature being obtained at the time of the pulse filling and an increase rate of the filling pressure Pd detected by the filling pressure meter 22, an estimate value of the volume of the in-vehicle tank 3 is determined by the known method.

Next, in Step S3, in accordance with the derived volume of the in-vehicle tank 3, the pressure detected by the filling pressure meter 22, and the external air temperature detected by the thermometer 25, a pressure increase rate and a pressure value in a final stage are derived based on SAE Standard J2601, and further, a relationship between the pressure of the hydrogen gas scheduled to be supplied and the target flow rate Qs is determined. As described above, in this gas supply apparatus 1, the filling pressure Pd detected by the filling pressure meter 22 is treated as the pressure inside the in-vehicle tank 3. Thus, the target flow rate Qs is shown as Qs (Pd) as a value uniquely determined from the filling pressure Pd.

Figure 3:
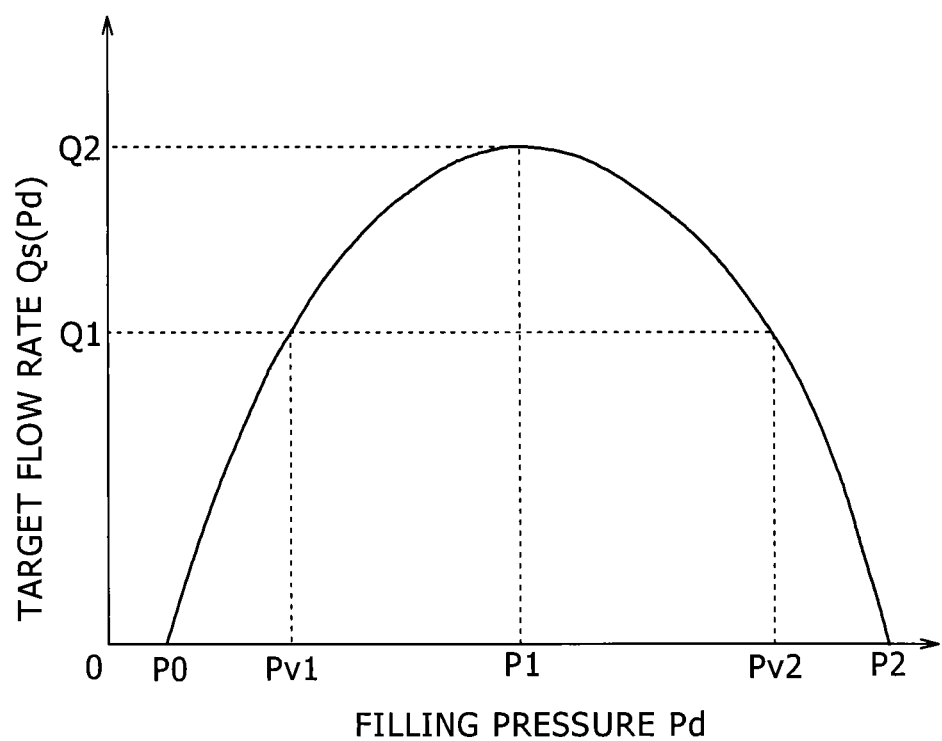
FIG. 3 A view showing a relationship between a filling pressure and a target flow rate in the gas supply apparatus of FIG. 1.

FIG. 3 shows one example of the target flow rate Qs (Pd). The target flow rate Qs (Pd) is set to be gradually increased from the filling start time and gradually reduced toward the filling finish time. A maximum flow rate Q2 of the target flow rate Qs (Pd) is set in accordance with the volume of the in-vehicle tank 3. That is, with a pressure P0 of the pressure (filling pressure Pd) of the in-vehicle tank 3 at the time of starting the filling of the hydrogen gas, a pressure P2 to be filled at the end, and a pressure P1 between the above pressures, the target flow rate Qs (Pd) draws a curve of Qs (P0)=Qs (P2)=0, Qs (P1)=Q2. By regulating the flow rate of the hydrogen gas in such a way, the hydrogen gas can be promptly filled while suppressing a radial temperature increase in the in-vehicle tank 3.

It should be noted that FIG. 3 shows a maximum discharge flow rate Q1 (flow rate at the time of totally closing the volume regulating valve 12) of the compressor 4, and corresponding values of the filling pressure Pd are Pv1 and Pv2. The pressure values Pv1 and Pv2 with the target flow rate Qs (Pd) being the maximum discharge flow rate Q1 are changed depending on the volume of the in-vehicle tank 3 or the like. It should be noted that in reality, the maximum discharge flow rate Q1 is slightly changed according to the filling pressure Pd. However, for simplicity, the maximum discharge flow rate Q1 is regarded as a fixed value.

Returning to FIG. 2, next, the supply blocking valve 15 and the filling blocking valve 19 are opened and the hydrogen compressed in the compressor 4 is sent out toward the in-vehicle tank 3 from the compressor 4 in Step S4. The control device 26 regulates the opening degree of the volume control valve 12 for example by PID control that feedbacks a difference between the flow rate Fd and the target flow rate Qs (Pd) in such a manner that the flow rate Fd detected by the flowmeter 16 matches with the target flow rate Qs (Pd) determined in Step S3.

Specifically, in a case where the actually measured flow rate Fd is greater than the target flow rate Qs (Pd) at the filling pressure Pd of that time, the opening degree of the volume regulating valve 12 is increased in order to reduce the flow rate of the hydrogen gas supplied from the compressor 4. Conversely, in a case where the actual flow rate Fd is less than the target flow rate Qs (Pd) of that time, the opening degree of the volume regulating valve 12 is decreased in order to increase the flow rate of the hydrogen gas supplied from the compressor 4.

In next Step S5, the apparatus stands by until the target flow rate Qs (Pd) reaches the maximum discharge flow rate Q1 of the compressor 4. That is, until the target flow rate Qs (Pd) reaches the maximum discharge flow rate Q1, the hydrogen gas is supplied to the in-vehicle tank 3 only by the compressor 4 whose volume is regulated by the volume regulating valve 12. It should be noted that the maximum discharge flow rate Q1 is arbitrarily set in accordance with the ability of the compressor 4 of supplying the hydrogen gas, and does not need to be the same value as that of the specification of the compressor 4. It should be noted that the fact that the target flow rate Qs (Pd) reaches the maximum discharge flow rate Q1 is determined by the fact that the volume regulating valve 12 is totally closed (fact that a total close command is issued from the control device 26 to the volume regulating valve 12).

When the target flow rate Qs (Pd) reaches the maximum discharge flow rate Q1, the flow proceeds to Step S6 and opening degree control of the pressure accumulator control valve 13 is started. When the pressure accumulator control valve 13 is opened, the hydrogen gas stored in the pressure accumulator 5 flows into the supply line 10. That is, the hydrogen gas is supplied from the compressor 4 and the hydrogen gas is supplied from the pressure accumulator 5 at the same time. The opening degree of the pressure accumulator control valve 13 is regulated for example by the PID control by the control device 26 in such a manner that the flow rate Fd detected by the flowmeter 16 matches with the target flow rate Qs (Pd). At this time, the target flow rate Qs (Pd) is equal to or greater than the maximum discharge flow rate Q1. Thus, the volume regulating valve 12 is totally closed and the discharge flow rate of the compressor 4 is maintained to be the maximum discharge flow rate Q1. That is, regulation of the flow rate Fd depends only on the pressure accumulator control valve 13.

Specifically, in a case where the actually measured flow rate Fd is greater than the target flow rate Qs (Pd) at the filling pressure Pd of that time, the opening degree of the pressure accumulator control valve 13 is decreased in order to reduce the flow rate of the hydrogen gas supplied from the pressure accumulator 5. Conversely, in a case where the actual flow rate Fd is less than the target flow rate Qs (Pd) of that time, the opening degree of the pressure accumulator control valve 13 is increased in order to increase the flow rate of the hydrogen gas supplied from the pressure accumulator 5.

As shown in FIG. 3, the target flow rate Qs (Pd) is increased in accordance with an increase in the filling pressure immediately after starting the opening degree control of the pressure accumulator control valve 13. However, when the filling pressure Pd reaches P1, the target flow rate becomes the maximum value Q2, and then is reduced in accordance with the increase in the filling pressure Pd. Thus, in next Step S7, the apparatus stands by until the target flow rate Qs (Pd) becomes the maximum value Q2 and then is reduced to the maximum discharge flow rate Q1 of the compressor 4. That is, until the target flow rate Qs (Pd) becomes equal to or less than the maximum discharge flow rate Q1, an amount of the hydrogen gas that corresponds to a difference between the target flow rate Qs (Pd) and the maximum discharge flow rate Q1 is supplied from the pressure accumulator 5 via the pressure accumulator control valve 13.

When the target flow rate Qs (Pd) is reduced to the maximum discharge flow rate Q1, the flow proceeds to Step S8, the pressure accumulator control valve 13 is closed, and the opening degree control is finished.

In Step S9, the apparatus stands by until the filling pressure Pd reaches the filling finishing pressure P2. In this period, the target flow rate Qs (Pd) is equal to or less than the maximum discharge flow rate Q1. Thus, the opening degree of the volume regulating valve 12 is regulated by the control device 26 in such a manner that the actual flow rate Fd becomes the target flow rate Qs (Pd).

When the filling pressure Pd reaches the filling finishing pressure P2, the operation of the compressor 4 is stopped and the supply of the hydrogen gas is finished in Step S10. Alternatively, the operation of the compressor 4 may be continued, and a step of closing the supply blocking valve 15 to stop the supply of the hydrogen gas to the in-vehicle tank 3 and opening the pressure accumulator control valve 13 to supply the hydrogen gas to the pressure accumulator 13 may be started.

As described above, in the gas supply apparatus 1 of the present embodiment, only in a case where the target flow rate Qs (Pd) exceeds the maximum discharge flow rate Q1 of the compressor 4, an amount of the hydrogen gas that exceeds the maximum discharge flow rate Q1 is supplied from the pressure accumulator 5. In the gas supply apparatus 1, in comparison to a gas supply apparatus that has only a compressor, the maximum discharge flow rate of the hydrogen gas to be supplied form the compressor 4 can be suppressed, so that the compressor 4 can be downsized. By adopting the small-volume compressor 4, the gas supply apparatus 1 can be inexpensively provided. Since the high-pressure hydrogen gas is supplied only by the compressor 4, there is no need for excessively boosting the pressure of the hydrogen gas stored in the pressure accumulator 5, so that the design pressure of the pressure accumulator 5 can be suppressed low. As a result, the structure of the pressure accumulator 5 can be simplified. Since the hydrogen gas is supplied by mainly using the compressor 4, the volume of the pressure accumulator 5 is not necessarily large.

It should be noted that as described above, the target flow rate Qs (Pd) is set in accordance with the volume of the in-vehicle tank 3. Therefore, in a case where the volume of the in-vehicle tank 3 is extremely small, there is a possibility that the maximum value Q2 of the target flow rate Qs (Pd) becomes a flow rate that is smaller than the maximum discharge flow rate Q1 of the compressor 4. In that case, the hydrogen gas may be supplied by not using the pressure accumulator 5 but using only the compressor 4.

Figure 4:
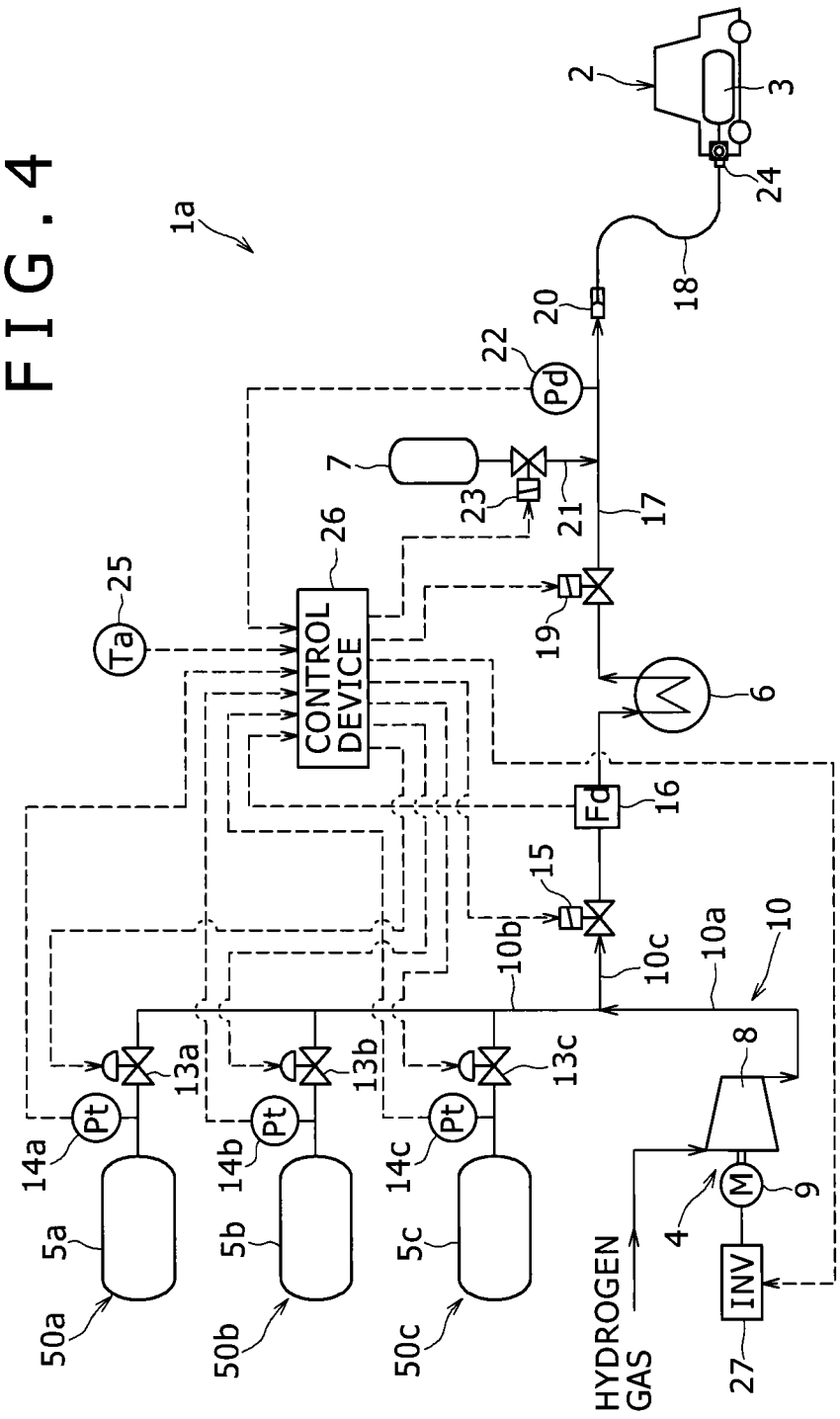
FIG. 4 A schematic configuration diagram of a gas supply apparatus of a second embodiment of the present invention.

Next, FIG. 4 shows a gas supply apparatus 1a according to a second embodiment of the present invention. In the description of the present embodiment, the same constituent elements as those of the first embodiment will be given the same reference numerals and overlapping elements will not be described.

The gas supply apparatus 1a of the present embodiment includes a plurality of pressure accumulation devices arranged in parallel to each other, that is, a first pressure accumulation device 50a, a second pressure accumulation device 50b, and a third pressure accumulation device 50c. The first pressure accumulation device 50a has a first pressure accumulator 5a, a first pressure accumulator control valve 13a, and an accumulated pressure meter 14a. The second pressure accumulation device 50b has a second pressure accumulator 5b, a second pressure accumulator control valve 13b, and an accumulated pressure meter 14b. The third pressure accumulation device 50c has a third pressure accumulator 5c, a third pressure accumulator control valve 13c, and an accumulated pressure meter 14c. The first pressure accumulator 5a, the second pressure accumulator 5b, and the third pressure accumulator 5c are arranged in parallel to each other and connected to the pressure accumulator-exclusive portion 10b of the supply line 10 via the respectively corresponding first, second, and third pressure accumulator control valves 13a, 13b, 13c. The corresponding accumulated pressure meters 14a, 14b, 14c are individually provided in the first to third pressure accumulators 5a, 5b, 5c. In the present embodiment, a higher-pressure hydrogen gas than that of the first pressure accumulator 5a is stored in the second pressure accumulator 5b, and a higher-pressure hydrogen gas than that of the second pressure accumulator 5b is stored in the third pressure accumulator 5c.

In the gas supply apparatus 1a of the present embodiment, the electric power is supplied from an inverter 27 to the motor 9 of the compressor 4. The control device 26 regulates the discharge flow rate of the compressor 4 by changing an output frequency of the inverter 27.

In the present embodiment, as well as the first embodiment, the target flow rate Qs (Pd) is set by estimating the volume of the in-vehicle tank 3, and the hydrogen gas is firstly supplied to the in-vehicle tank 3 only from the compressor 4. When the target flow rate Qs (Pd) reaches the maximum discharge flow rate Q1, only an opening degree of the first pressure accumulator control valve 13a is firstly controlled. It should be noted that the fact that the target flow rate Qs (Pd) reaches the maximum discharge flow rate Q1 is determined by the fact that the rotation number of the compressor reaches the rotation number of the compressor 4 that corresponds to the maximum discharge flow rate Q1 (maximum rotation number) (fact that a command to rotate by the maximum rotation number is issued from the control device 26 to the inverter 27, that is, the motor 9 of the compressor 4). When the filling pressure Pd is increased and reaches a predetermined first switching pressure Ps1, the first pressure accumulator control valve 13a is closed and opening degree control of the second pressure accumulator control valve 13b is started. When the filling pressure Pd is further increased and reaches a predetermined second switching pressure Ps2, the second pressure accumulator control valve 13b is closed and opening degree control of the third pressure accumulator control valve 13c is started. It should be noted that the first switching pressure Ps1 and the second switching pressure Ps2 are values that are optimized in accordance with the pressures and the volumes of the pressure accumulators 5a, 5b, 5c. For example, the first switching pressure Ps1 is 40 MPa, and the second switching pressure Ps2 is 60 MPa.

Figure 5:
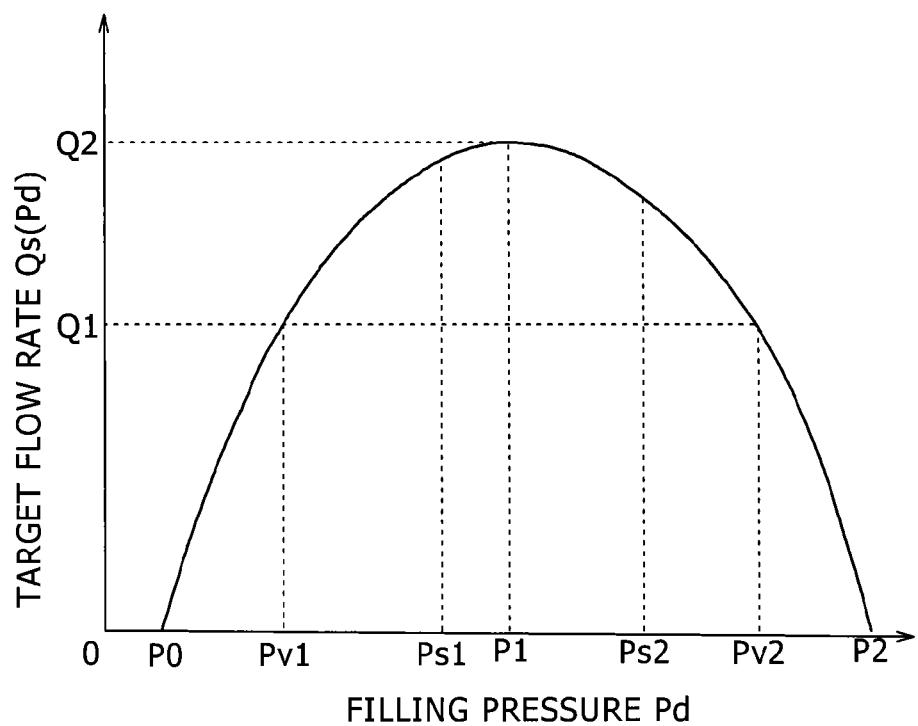
FIG. 5 A view showing a relationship between a filling pressure and a target flow rate in the gas supply apparatus of FIG. 4.

FIG. 5 shows a relationship between the target flow rate Qs (Pd), and the first switching pressure Ps1 and the second switching pressure Ps2. In the present embodiment, while the filling pressure Pd is from the pressure Pv1 with the target flow rate Qs (Pd) being the maximum discharge flow rate Q1 to the first switching pressure Ps1, only the first pressure accumulator 5a supplies an amount of the hydrogen gas that is a shortage of the compressor 4. While the filling pressure Pd is from the first switching pressure Ps1 to the second switching pressure Ps2, only the second pressure accumulator 5b assists the compressor 4. While the filling pressure is from the second switching pressure Ps2 to the pressure Pv2 with the target flow rate Qs (Pd) being the maximum discharge flow rate Q1, only the third pressure accumulator 5c supplements the compressor 4.

It should be noted that the target flow rate Qs (Pd) is also set in accordance with the volume of the in-vehicle tank 3 in the present embodiment. Thus, the pressures Pv1 and Pv2 with the target flow rate Qs (Pd) being the maximum discharge flow rate Q1 are changed in accordance with the volume of the in-vehicle tank 3. Therefore, the first pressure accumulator 5a may be not used in a case where the pressure Pv1 is higher than the first switching pressure Ps1, and the third pressure accumulator 5c may be not used in a case where the pressure Pv2 is lower than the second switching pressure Ps2.

By providing the plurality of pressure accumulators 5a, 5b, 5c as in the present embodiment, the volumes of the pressure accumulators 5a, 5b, 5c can be respectively reduced. By varying use pressure ranges of the pressure accumulators 5a, 5b, 5c, pressure resistance of the low-pressure pressure accumulators 5a, 5b is lowered and the pressure accumulators can be inexpensively formed. Since the volume of the high-pressure pressure accumulator 5c is not necessarily large, the structure is simple and inexpensive. Further, since pressure changes of the pressure accumulators 5a, 5b, 5c are small, the precision of flow rate control is enhanced. The number of the pressure accumulators may be two, four, or more.

In the first embodiment, the discharge flow rate of the hydrogen gas from the compressor main body 8 may be controlled by an inverter. In the second embodiment, as well as the first embodiment, the discharge flow rate of the hydrogen gas from the compressor main body 8 may be regulated by using the volume regulating valve. In the above embodiments, the reciprocating compressor is used as the compressor 4. However, other types of compressors such as an ionic compressor may be used.

DESCRIPTION OF THE REFERENCE NUMERALS 1, 1a: Gas supply apparatus
3: Tank
4: Compressor
5, 5a, 5b, 5c: Pressure accumulator
7: Initial filling reservoir
12: Volume regulating valve
13, 13a, 13b, 13c: Pressure accumulator control valve
22: Filling pressure meter
24: Nozzle
26: Control device
27: Inverter

The invention claimed is:

1. A gas supply method of supplying a gas to a tank from a compressor and a pressure accumulator, connected in parallel to a gas inlet of the tank, the pressure accumulator being capable of storing the gas compressed by the compressor, comprising:
   a flow rate determination step of determining a relationship between a filling pressure that serves as a pressure of the gas to be supplied to the tank and a target flow rate that serves as a target value of a flow rate of the gas to be supplied to the tank before supplying the gas to the tank from the compressor; and
   a flow rate control step of detecting the filling pressure, determining the target flow rate, and controlling the flow rate of the gas to be supplied into the tank according to the target flow rate, wherein
   in the flow rate control step, the gas is supplied to the tank only from the compressor in a case where the target flow rate is equal to or less than a maximum discharge flow rate of the compressor, and the gas is supplied to the tank from the compressor and the pressure accumulator in a case where the target flow rate is greater than the maximum discharge flow rate.

2. The gas supply method according to claim 1, wherein in a case where the target flow rate is greater than the maximum discharge flow rate, a flow rate of the gas to be supplied to the tank from the compressor is fixed and a flow rate of the gas to be supplied to the tank from the pressure accumulator is regulated, so that the total flow rate of the gas to be supplied to the tank matches with the target flow rate.

3. A gas supply apparatus for supplying a gas to a tank, comprising:
   a volume-controllable compressor that compresses the gas to be supplied to the tank;

a pressure accumulator connected, in parallel with the compressor, to a gas inlet of the tank, the pressure accumulator being capable of storing the gas compressed by the compressor;

a pressure accumulator control valve that regulates a flow rate of the gas flowing out from the pressure accumulator;

a flowmeter that detects a flow rate of the gas to be supplied to the tank;

a filling pressure meter that detects a pressure of the gas to be supplied to the tank; and a controller that controls the volume of the compressor and an opening degree of the pressure accumulator control valve, wherein the controller determines a relationship between a filling pressure that serves as a pressure of the gas to be supplied to the tank and a target flow rate that serves as a target value of a flow rate of the gas to be supplied to the tank before supplying the gas to the tank from the compressor, determines the target flow rate based on the pressure detected by the filling pressure meter, closes the pressure accumulator control valve and supplies the gas to the tank only from the compressor in a case where the target flow rate is equal to or less than a maximum discharge flow rate of the compressor, and opens the pressure accumulator control valve and supplies the gas to the tank from the compressor and the pressure accumulator in a case where the target flow rate is greater than the maximum discharge flow rate.

4. The gas supply apparatus according to claim 3, wherein the compressor has a return line that provides communication between the discharge side and the suction side, a volume regulating valve whose opening degree is regulatable is provided in the return line, and the target flow rate having reached the maximum discharge flow rate of the compressor is determined by the volume regulating valve being totally closed.

5. The gas supply apparatus according to claim 3, wherein the rotation number of the compressor is controllable, and the fact that the target flow rate reaches the maximum discharge flow rate of the compressor is determined by the fact that the rotation number becomes the maximum rotation number.

6. The gas supply apparatus according to claim 3, comprising:

a plurality of pressure accumulators that includes the pressure accumulator, wherein the pressure accumulators are arranged in parallel to each other and store gases at different pressures from each other, and the controller supplies the gas to the tank from any one of the pressure accumulators in accordance with the pressure detected by the filling pressure meter.

7. The gas supply apparatus according to claim 3, wherein the compressor is a reciprocating compressor.

8. The gas supply apparatus according to claim 3, having:

a nozzle that fits an in-vehicle tank mounted in a fuel cell-powered vehicle.

* * * * *